United States Patent
Zemitis et al.

(10) Patent No.: US 11,946,386 B2
(45) Date of Patent: Apr. 2, 2024

(54) TURBINE BLADE TIP SHROUD SURFACE PROFILES

(71) Applicant: General Electric Company, Schenectady, NY (US)

(72) Inventors: William Scott Zemitis, Simpsonville, SC (US); Robert Tomasz Liskiewicz, Warsaw (PL)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/340,483

(22) Filed: Jun. 23, 2023

(65) Prior Publication Data
US 2024/0003259 A1    Jan. 4, 2024

(30) Foreign Application Priority Data
Jun. 30, 2022 (PL) .......................... 441606

(51) Int. Cl.
*F01D 5/14* (2006.01)

(52) U.S. Cl.
CPC ........ *F01D 5/141* (2013.01); *F05D 2240/307* (2013.01)

(58) Field of Classification Search
CPC .......................... F01D 5/141; F05D 2240/307
See application file for complete search history.

(56) References Cited

U.S. PATENT DOCUMENTS

| | | | |
|---|---|---|---|
| 8,043,061 B2 | 10/2011 | Chiurato et al. | |
| 8,057,186 B2 | 11/2011 | Brittingham | |
| 8,192,166 B2 | 6/2012 | Beeck et al. | |
| 10,683,759 B2* | 6/2020 | Zemitis | F01D 5/225 |
| 10,704,392 B2* | 7/2020 | Zemitis | F01D 5/225 |

* cited by examiner

*Primary Examiner* — Courtney D Heinle
*Assistant Examiner* — Andrew Thanh Bui
(74) *Attorney, Agent, or Firm* — Charlotte Wilson; James Pemrick; Hoffman Warnick LLC

(57) ABSTRACT

Various embodiments include a turbine blade having an airfoil with a tip shroud having a forwardmost tip rail having one or more pressure side and suction side bevel surfaces and pressure side and suction side scallop surfaces. The surfaces have a nominal profile substantially in accordance Cartesian coordinate values of X, Y and Z set forth in various tables herein. The Cartesian coordinate values are non-dimensional values of from 0% to 100% convertible to distances by multiplying the values by a tip rail length expressed in units of distance. The X, Y and Z values are connected by smooth continuing arcs that are joined smoothly with one another to form the nominal profile that defines the suction side scallop surface, the pressure side scallop surface, the suction side bevel surface, or the pressure side bevel surface.

19 Claims, 11 Drawing Sheets

TURBINE BLADE TIP SHROUD SURFACE PROFILES

CROSS-REFERENCE TO RELATED APPLICATIONS

This application claims priority pursuant to 35 U.S.C. 119(a) to Polish Application No. P.441606, filed Jun. 30, 2022, which application is incorporated herein by reference in its entirety.

TECHNICAL FIELD

The subject matter disclosed herein relates to turbomachines. More particularly, the subject matter disclosed herein relates to turbine blade tip shroud surface profiles.

BACKGROUND

Some jet aircraft and simple or combined cycle power plant systems employ turbines, or turbomachines, in their configuration and operation. Some of these turbines employ airfoils on rotating blades, which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. Certain airfoils include tip shrouds that are coupled to outer radial ends of the airfoils. The tip shrouds interact to form the exterior portion of a flow path relative to the rotating blades that include the tip shrouds. The tip shrouds are exposed to a variety of stresses that impact creep life thereof. Improvements in tip shroud geometry in certain areas of the tip shroud would reduce the mass of the tip shroud, thereby reducing stress and/or creep. A consequence of such stress and/or creep reduction is an extension of the useful life of the shrouded rotating blades.

BRIEF DESCRIPTION

All aspects, examples and features mentioned below can be combined in any technically possible way.

An aspect of the disclosure includes a turbine blade comprising: an airfoil having: a suction side, a pressure side opposing the suction side, a leading edge spanning between the pressure side and the suction side, and a trailing edge opposing the leading edge and spanning between the pressure side and the suction side; and a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a suction side scallop surface having a shape having a nominal profile substantially in accordance with Cartesian coordinate values of X, Y and Z set forth in TABLE I and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side scallop surface.

Another aspect of the disclosure includes any of the preceding aspects, and the turbine blade includes a third stage blade.

Another aspect of the disclosure includes any of the preceding aspects, and the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

Another aspect of the disclosure includes any of the preceding aspects, and the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

Another aspect of the disclosure includes any of the preceding aspects, and the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

Another aspect of the disclosure includes any of the preceding aspects, and the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface; and wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

Another aspect of the disclosure includes any of the preceding aspects, and the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface; and wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

Another aspect of the disclosure includes any of the preceding aspects, and the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface; and wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

Another aspect of the disclosure includes any of the preceding aspects, and the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

An aspect of the disclosure includes a turbine blade comprising: an airfoil having: a suction side, a pressure side opposing the suction side, a leading edge spanning between the pressure side and the suction side, and a trailing edge opposing the leading edge and spanning between the pressure side and the suction side; and a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

Another aspect of the disclosure includes any of the preceding aspects, and the turbine blade includes a third stage blade.

An aspect of the disclosure provides a turbine blade comprising: an airfoil having: a suction side, a pressure side opposing the suction side, a leading edge spanning between the pressure side and the suction side, and a trailing edge opposing the leading edge and spanning between the pressure side and the suction side; and a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

Another aspect of the disclosure includes any of the preceding aspects, and the turbine blade includes a third stage blade.

Another aspect of the disclosure includes any of the preceding aspects, and the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs joined that are smoothly with one another to form the nominal profile that defines the suction side bevel surface.

Another aspect of the disclosure includes any of the preceding aspects, and the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

Another aspect of the disclosure includes any of the preceding aspects, and the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface; and wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

An aspect of the disclosure includes a turbine blade comprising: an airfoil having: a suction side, a pressure side opposing the suction side, a leading edge spanning between the pressure side and the suction side, and a trailing edge opposing the leading edge and spanning between the pressure side and the suction side; and a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

Another aspect of the disclosure includes any of the preceding aspects, and the turbine blade includes a third stage blade.

Two or more aspects described in this disclosure, including those described in this summary section, may be combined to form implementations not specifically described herein.

The details of one or more implementations are set forth in the accompanying drawings and the description below. Other features, objects, and advantages will be apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
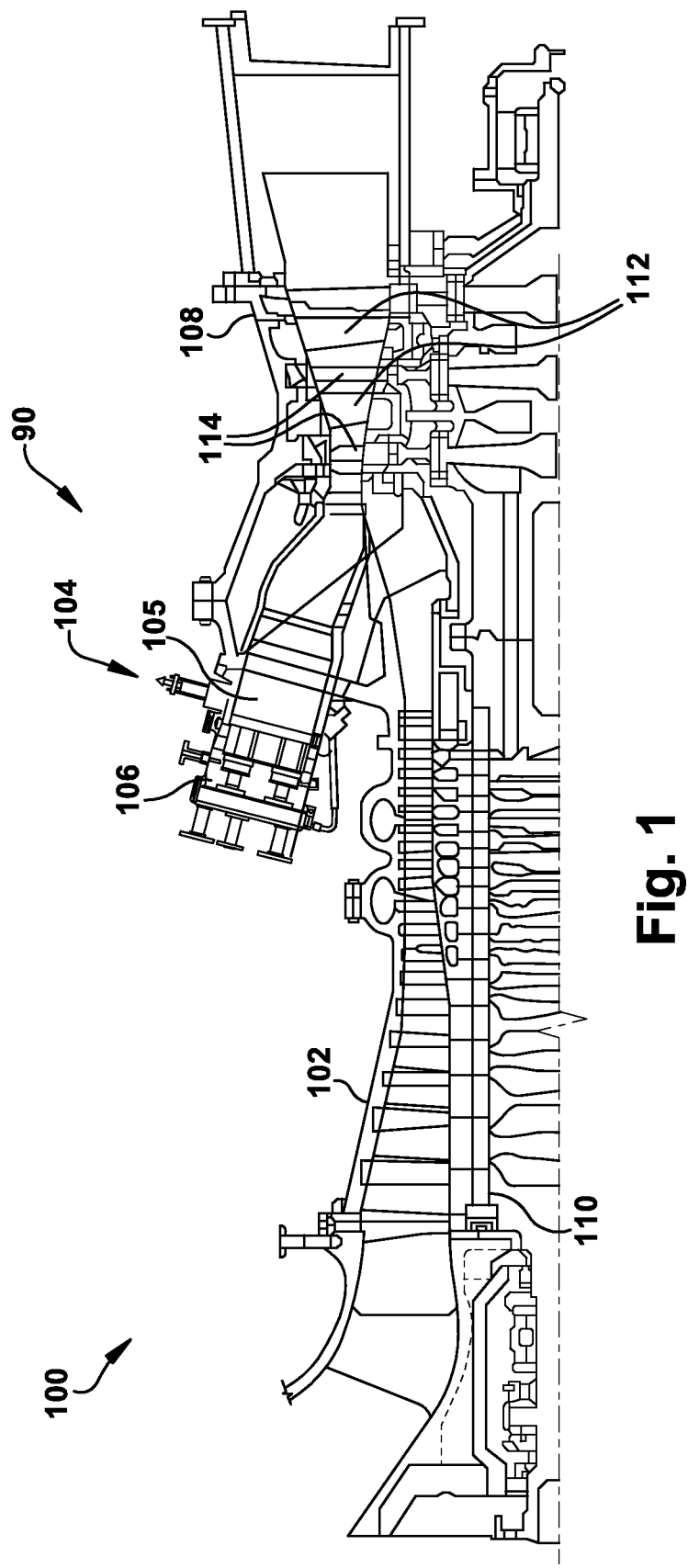
FIG. 1 shows a schematic illustration of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring generally to the front or compressor end of the turbine engine, and "aft" referring generally to the rearward or turbine end of the turbine engine. The term "fore" may be used interchangeably with the term "forward."

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine section or turbine engine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described element or feature may or may not be present and that the description includes instances where the element or feature is present and instances where it is not.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine blades that rotate (hereinafter, "blade" or "turbine blade"). Various embodiments include a turbine blade having an airfoil having: a suction side, a pressure side opposing the suction side, a leading edge spanning between the pressure side and the suction side, and a trailing edge opposing the leading edge and spanning between the pressure side and the suction side. The turbine blades also have a tip shroud connected with a tip of the airfoil along the suction side, the pressure side, the trailing edge, and the leading edge. The tip shroud includes a forwardmost tip rail extending radially therefrom and having a forward edge including a suction side origin closest to the suction side of the airfoil and a pressure side origin closest to the pressure side of the airfoil. A tip rail length is defined by a straight line between the pressure side origin and the suction side origin.

The forwardmost tip rail has a suction side bevel surface, a suction side scallop surface, a pressure side bevel surface, and a pressure side scallop surface. The bevel and scallop surfaces each have a shape having a nominal profile substantially in accordance with Cartesian coordinate values of X, Y and Z set forth in a respective table and originating at a selected one of the pressure side origin and the suction side origin. The Cartesian coordinate values are non-dimensional values of from 0% to 100% convertible to distances by multiplying the values by the tip rail length expressed in units of distance. The X, Y and Z values are connected by smooth continuing arcs that are joined smoothly with one another to form the nominal profile that defines the respective bevel surface or scallop surface. The disclosed surface profiles provide lower mass to tip shroud, thereby reducing creep due to stress and lengthening a life of tip shroud and blade. The surface profiles, however, do not change interaction between adjacent tip shrouds within a stage in a turbine, nor do they change (reduce) aerodynamic efficiency.

Referring to the drawings, FIG. 1 shows a schematic view of an illustrative turbomachine 90 in the form of a combustion turbine or gas turbine (GT) system 100 (hereinafter, "GT system 100"). GT system 100 includes a compressor 102 and a combustor 104. Combustor 104 includes a combustion region 105 and a head end 106 including a plurality of fuel nozzle assemblies. GT system 100 also includes a turbine 108 and a common rotor compressor/turbine shaft 110 (hereinafter referred to as "rotor shaft 110").

In one non-limiting embodiment, GT system 100 is a GT26 engine, commercially available from General Electric Company, Greenville, S.C. The present disclosure is not limited to any one particular GT system and may be implemented in connection with other engines including, for example, the other GT, HA, F, B, LM, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
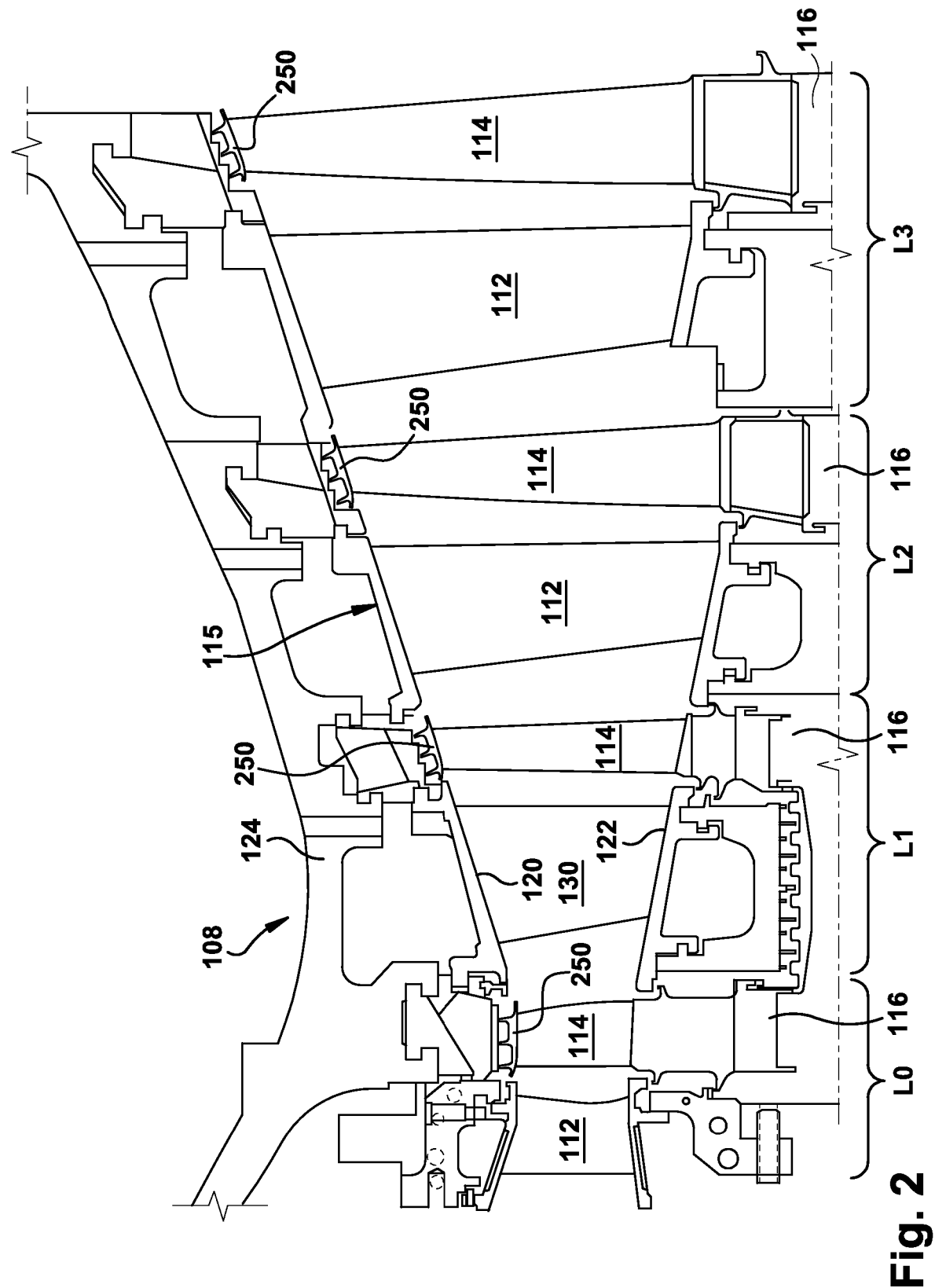
FIG. 2 is a cross-sectional view of an illustrative gas turbine assembly with four turbine stages that may be used with the turbomachine in FIG. 1.

FIG. 2 shows a cross-sectional view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one non-limiting example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor shaft 110 (FIG. 1). That is, a plurality of rotating blades 114 are mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with an airfoil 130. In the example shown, nozzle 112 includes a radially outer endwall 120 and a radially inner endwall 122. Radially outer endwall 120 couples nozzle 112 to a stationary casing 124 of turbine 108.

In operation, air flows through compressor 102, and compressed air is supplied to combustor 104. Specifically, the compressed air is supplied to fuel nozzle assemblies that are integral with head end 106 of combustor 104. Fuel nozzle assemblies are in flow communication with combustion region 105. Fuel nozzle assemblies are also in flow communication with a fuel source (not shown in FIG. 1) and channel fuel and air to combustion region 105. Combustor 104 ignites and combusts fuel. Combustor 104 is in flow communication with turbine 108 (i.e., expansion turbine) within which gas stream thermal energy is converted to mechanical rotational energy. Turbine 108 is rotatably coupled to and drives rotor shaft 110. Compressor 102 also is rotatably coupled to rotor shaft 110. At least one end of rotating rotor shaft 110 may extend axially away from turbine 108 and may be attached to a load or machinery (not shown), such as, but not limited to, a generator, a load compressor, and/or another turbine.

Figure 3:
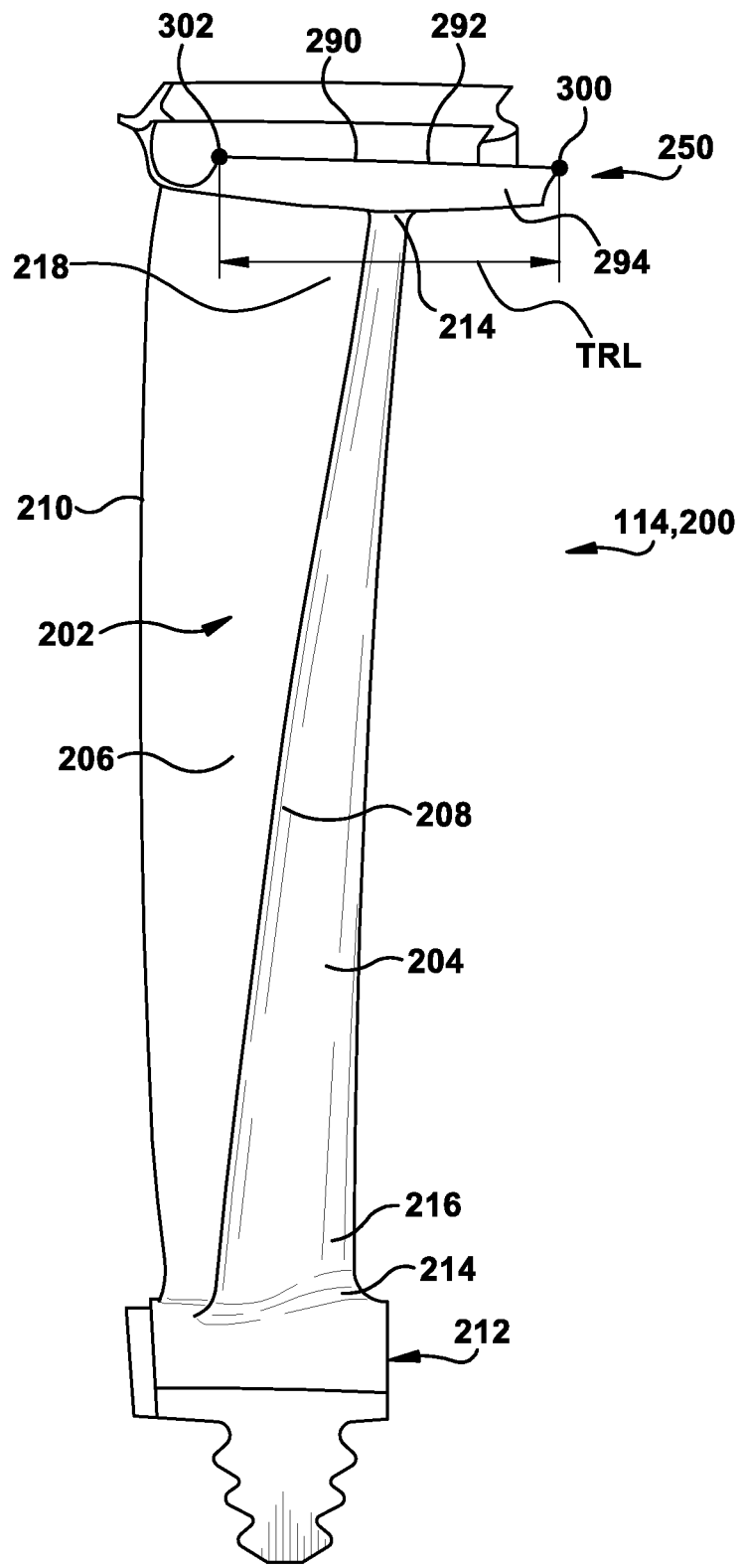
FIG. 3 shows a front perspective view of an illustrative turbine blade including an airfoil and a tip shroud, according to various embodiments of the disclosure.

FIG. 3 shows a front perspective view of a blade 200, according to embodiments of the disclosure. Blade 200 is a rotatable (dynamic) blade, which is part of the set of turbine rotor blades 114 (FIG. 2) circumferentially dispersed about rotor shaft 110 (FIG. 1) in a stage of a turbine (e.g., turbine 108). During operation of the turbine, a working fluid (e.g., gas or steam) is directed across the blade's airfoil, and blade 200 will rotate with rotor shaft 110 (FIG. 1) about an axis defined by rotor shaft 110 (FIG. 1). It is understood that blade 200 is configured to couple with a plurality of similar or distinct blades (e.g., blades 200 or other blades) with respective tip shrouds 250 to form a set of blades in a stage of the turbine (e.g., one of stages L0-L3 shown in FIG. 2).

Blade 200 can include an airfoil 202 having a suction side 204 (partially obstructed in FIG. 3) and a pressure side 206 opposing suction side 204. Blade 200 can also include a leading edge 208 spanning between pressure side 206 and suction side 204, and a trailing edge 210 opposing leading edge 208 and spanning between pressure side 206 and suction side 204. As shown, blade 200 can also include an endwall 212 connected with a root portion (a "first end" 216) of airfoil 202, and tip shroud 250 connected with a tip portion (a "second end" 218) of airfoil 202 on an opposite end of airfoil 202 from endwall 212.

Endwall 212 is configured to fit into a mating slot in rotor shaft 110 (FIG. 1) and to mate with adjacent components of other blades 200. Endwall 212 is intended to be located radially inboard of airfoil 202 and to be formed in any complementary configuration to rotor shaft 110 (FIG. 1). Endwall 212 can have any suitable configuration to connect to rotor shaft 110 (FIG. 1), e.g., dovetail or other coupling mechanism.

Endwall 212 and tip shroud 250 can connect to airfoil 202 along suction side 204, pressure side 206, trailing edge 210 and leading edge 208. For example, airfoil 202 of blade 200 can be coupled to endwall 212 and tip shroud 250 by fillets 214 proximate first end 216 of airfoil 202 and second end 218 of airfoil 202, respectively. Fillets 214 can include a weld or braze fillet, which may be formed via conventional MIG welding, TIG welding, brazing, etc.

With reference to FIGS. 2 and 3, in various non-limiting embodiments, blade 200 can include a first stage (L0) blade, a second stage (L1) blade, a third stage (L2) blade, or a fourth stage (L3) blade. In particular embodiments, blade 200 is a third stage (L2) blade. In various embodiments, turbine 108 can include a set of blades 200 in only the first stage (L0), or in only second stage (L1), or in only third stage (L2), or in only fourth stage (L3) of turbine 108.

Figure 4:
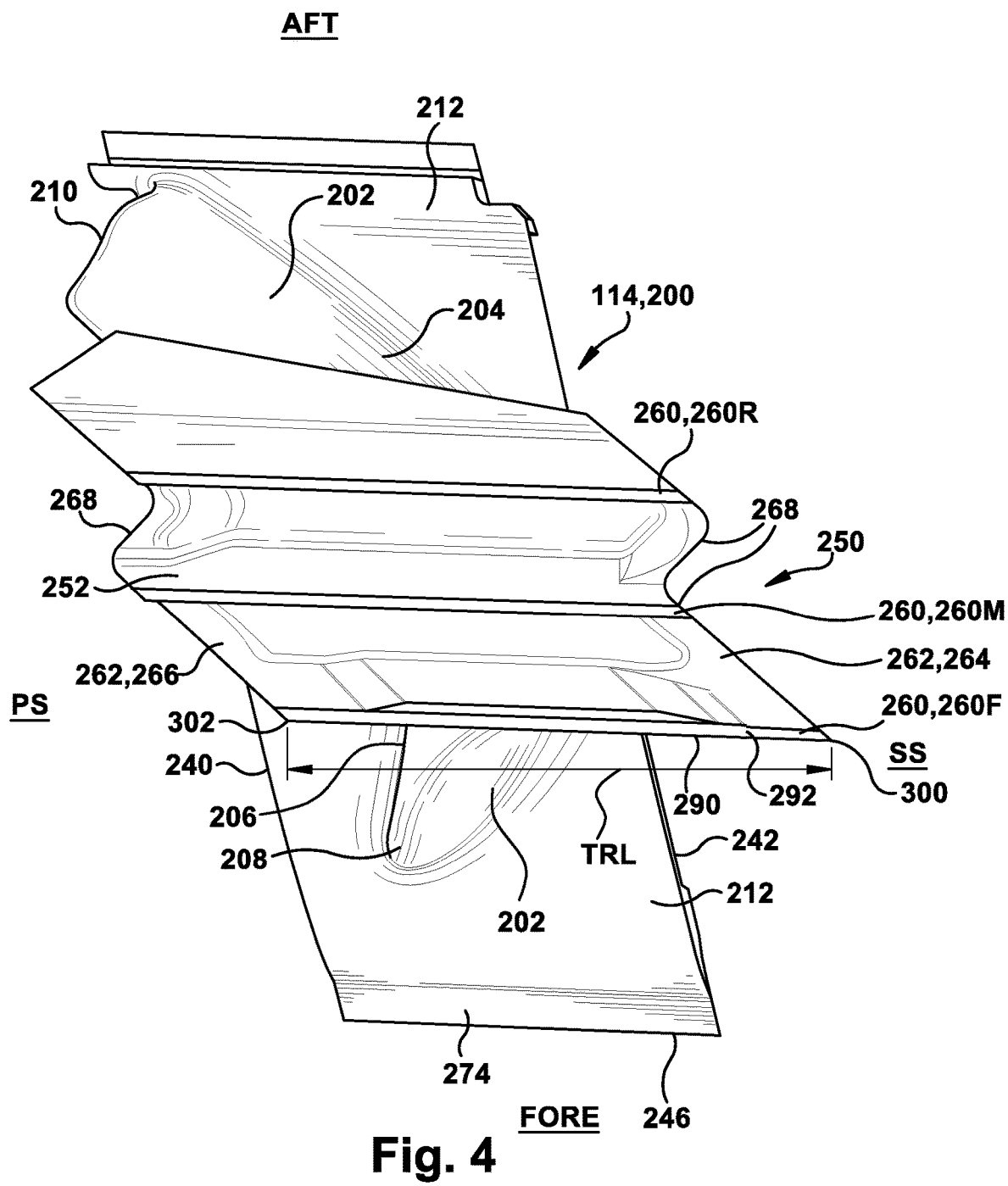
FIG. 4 shows a top-down view of a tip shroud including a plurality of tip rails, according to various embodiments of the disclosure.
Figure 5:
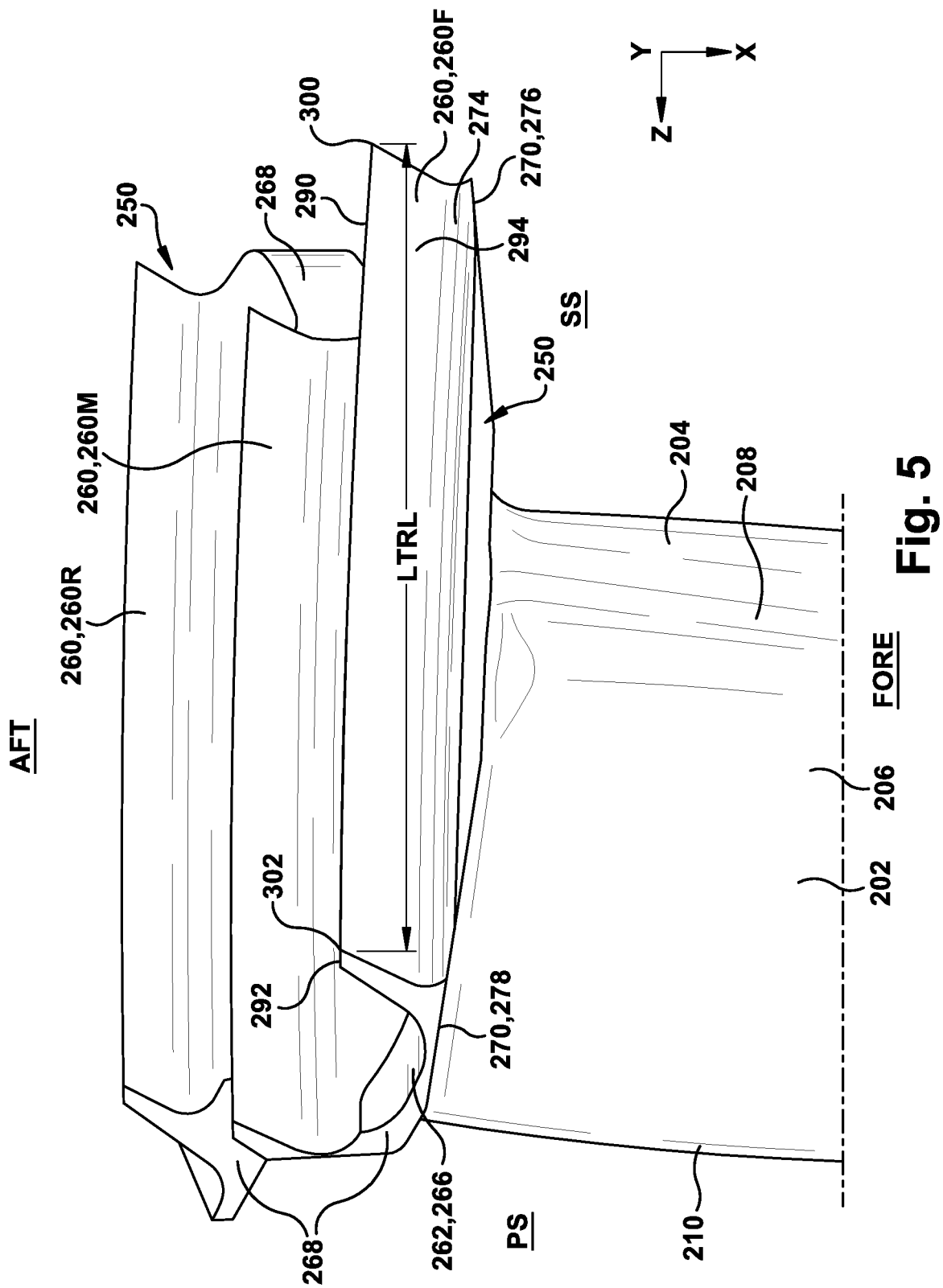
FIG. 5 shows a front view of a tip shroud including a plurality of tip rails, according to various embodiments of the disclosure.

FIG. 4 shows a top-down (i.e., radially inward) view of tip shroud 250, and FIG. 5 shows a front (i.e., aft-looking) view of tip shroud 250. Tip shroud 250 can include a body 252 and one or more tip rails 260 that extend radially from body 252. In the non-limiting example shown, tip shroud 250 includes three tip rails 260, including a forwardmost tip rail 260F, a rearward-most tip rail 260R, and a middle tip rail 260M. Tip shroud 250 can include more or fewer tip rails 260. Embodiments of the disclosure relate to bevel surface profiles and scallop surface profiles of forwardmost tip rail 260F.

For reference purposes, in FIGS. 4-11, a forward side of tip shroud 250 that is generally to the front or compressor end of the engine is indicated with "FORE," and an aft side of tip shroud 250 that is generally to the rearward or turbine end of the engine is indicated with "AFT." As also shown in FIGS. 4-11, where appropriate, a pressure side of tip shroud 250 is indicated with "PS," and/or a suction side of tip shroud 250 is indicated with "SS." It is noted that blade 200 may not be mounted in rotor shaft 110 in a perfectly axial direction. For example, as shown in FIG. 4, angling of side slash faces 240, 242 of platform 212 of blade 200 relative to a forward slash face 246 thereof may allow blade to slide into rotor wheel 116 (FIG. 2) at an angle relative to the axis of rotor shaft 110.

Figure 6:
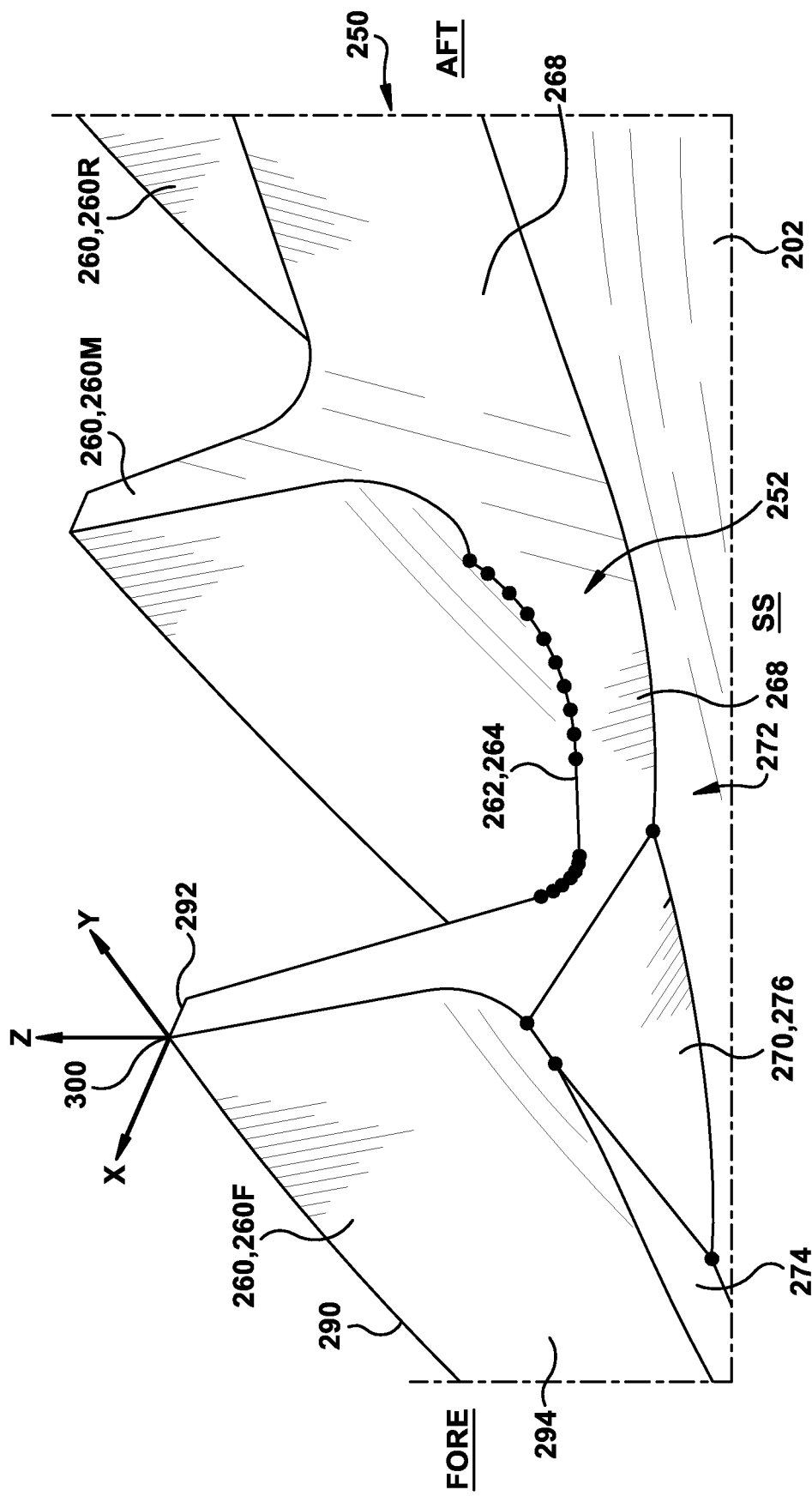
FIG. 6 shows a perspective view of a suction side of a forwardmost tip rail of the tip shroud, according to various embodiments of the disclosure.
Figure 7:
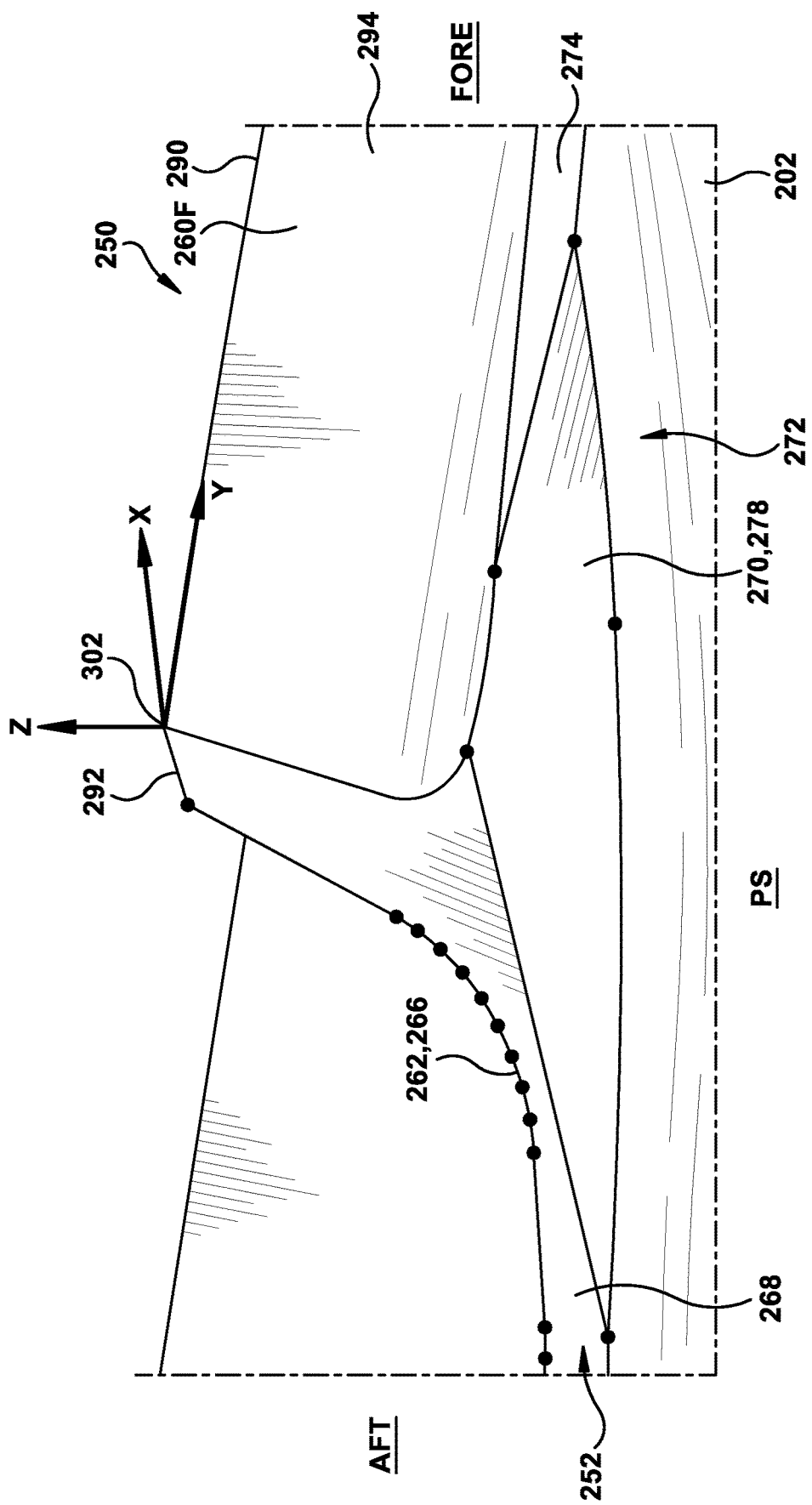
FIG. 7 shows a perspective view of a pressure side of a forwardmost tip rail of the tip shroud, according to various embodiments of the disclosure.

FIG. 5 shows a front (i.e., aft-looking) view of tip shroud 250 including all tip rails 260, FIG. 6 shows a perspective view of a suction side (SS) of forwardmost tip rail 260F, and FIG. 7 shows a perspective view of a pressure side (PS) of forwardmost tip rail 260F. As used herein, a "scallop" surface 262 of forwardmost tip rail 260F is a surface on body 252 that is immediately aft of forwardmost tip rail 260F, and to some degree between forwardmost tip rail 260F and a next-aft-ward tip rail, e.g., middle tip rail 260M. Typically, scallop surface 262 may be curved radially outwards towards forwardmost tip rail 260F, but does not extend much, if at all, radially as part of forwardmost tip rail 260F. Forwardmost tip rail 260F of tip shroud 250 includes a suction side (SS) scallop surface 264 near a suction side (SS) thereof, and a pressure side (PS) scallop surface 266 near a pressure side (PS) thereof.

Figure 8:
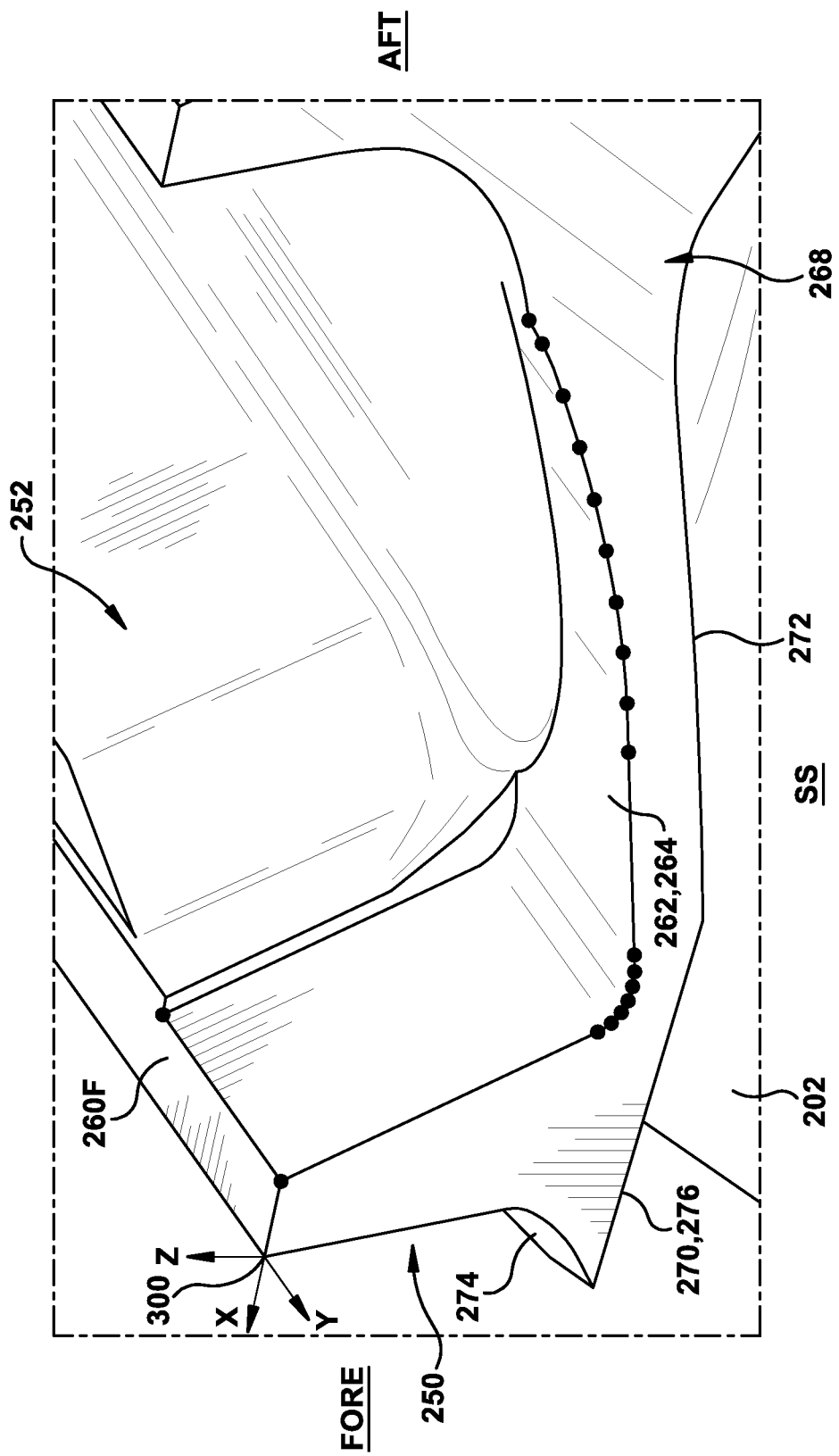
FIG. 8 shows an enlarged perspective view of a suction side of a forwardmost tip rail of the tip shroud including a suction side scallop surface profile, according to various embodiments of the disclosure.
Figure 9:
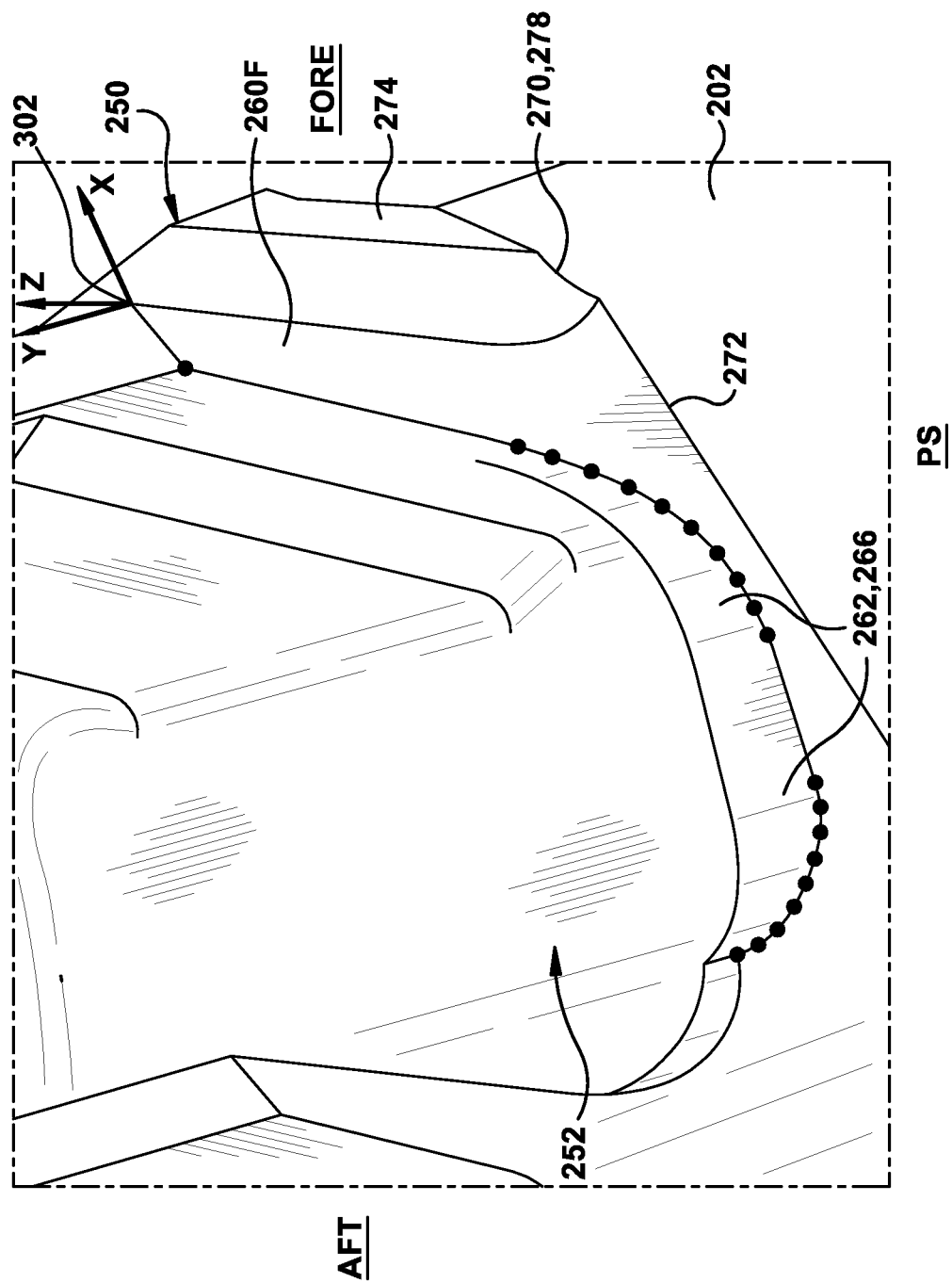
FIG. 9 shows an enlarged perspective view of a pressure side of a forwardmost tip rail of the tip shroud including a pressure side scallop surface profile, according to various embodiments of the disclosure.

Scallop surfaces 264, 266 are generally at an edge of body 252 along a Z-notch 268 thereof, and generally but not necessarily face radially outward. A "Z-notch" is a curved, somewhat Z-shaped end surface of body 252 of tip shroud 250 that mates with a Z-notch of an adjacent, similarly shaped tip shroud 250 in a selected stage of turbine 108 (FIGS. 1-2). Collectively, the tip shrouds 250 and their mating Z-notches form an outer boundary of a hot gas path through turbine 108 (FIG. 2). FIG. 8 shows an enlarged perspective view of suction side of forwardmost tip rail 260F of tip shroud 250 including SS scallop surface 264, and FIG. 9 shows an enlarged perspective view of pressure side of forwardmost tip rail 260F of tip shroud 250 including PS scallop surface 266.

Figure 10:
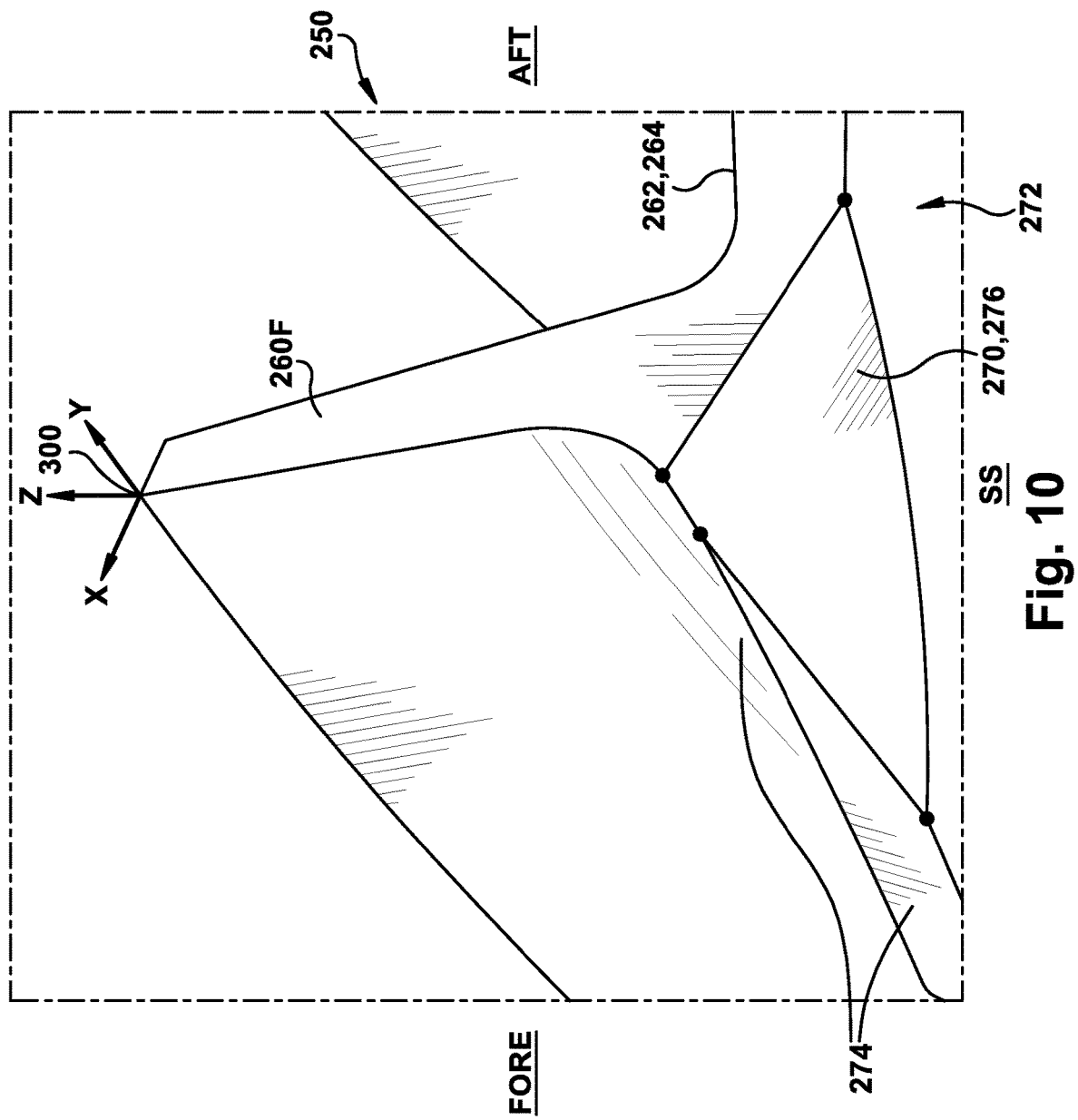
FIG. 10 shows an enlarged perspective view of a suction side of a forwardmost tip rail of the tip shroud including a suction side bevel surface profile, according to various embodiments of the disclosure.
Figure 11:
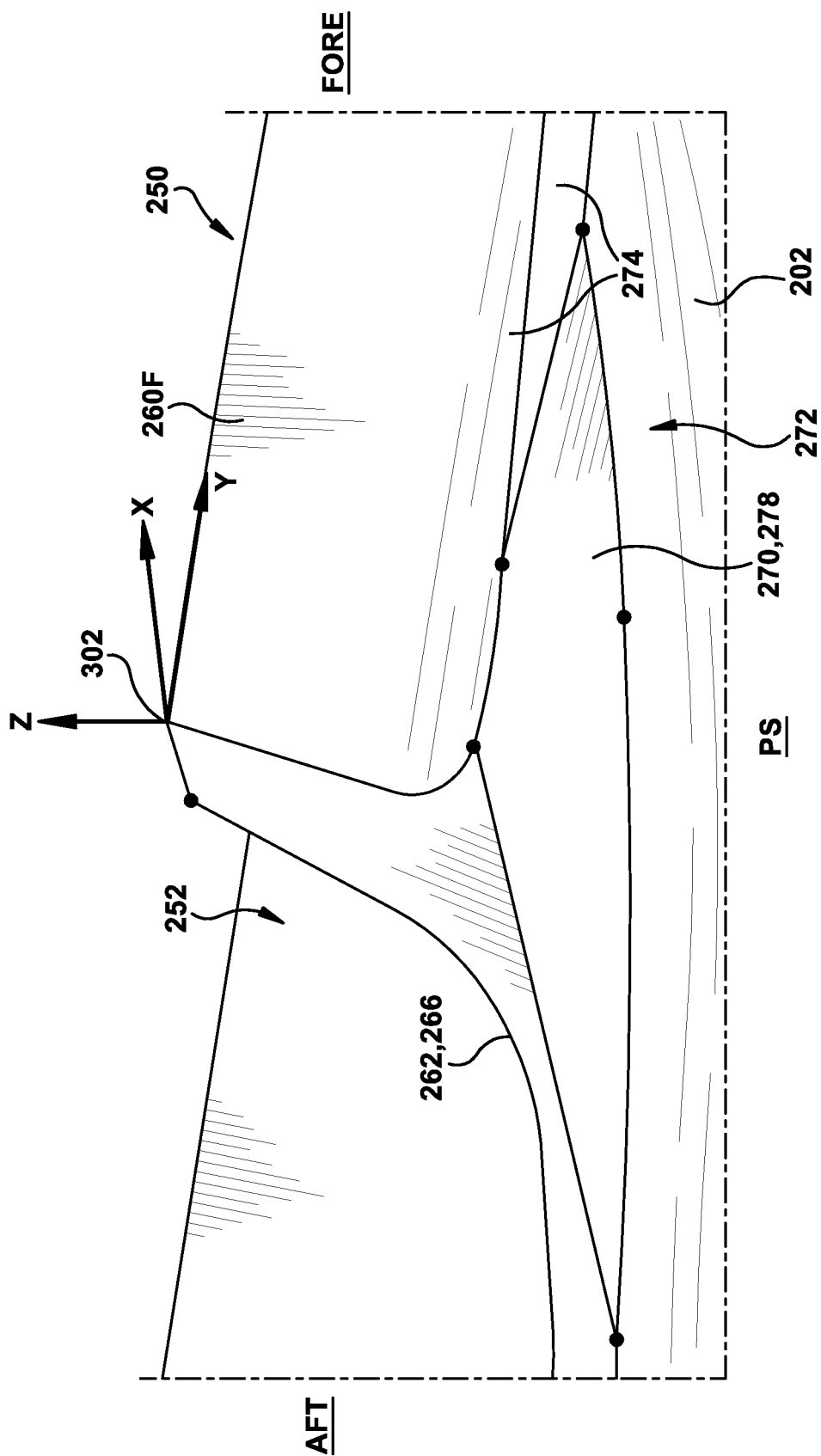
FIG. 11 shows an enlarged perspective view of a pressure side of a forwardmost tip rail of the tip shroud including a pressure side bevel surface profile, according to various embodiments of the disclosure.

As used herein, a "bevel" surface 270 of forwardmost tip rail 260F is that surface on body 252 that is below tip rail 260F, and that may be between and/or join, for example, a radially inward facing surface 272 of body 252, a surface of Z-notch 268, and a generally forward-facing surface 274 of body 252 that extends forwardly of forwardmost tip rail 260F, among other surfaces. Bevel surfaces 270 may be planar or curved. Forwardmost tip rail 260F of tip shroud 250 includes a suction side (SS) bevel surface 276 near a suction side (SS) thereof, and a pressure side (PS) scallop surface 278 near a pressure side (PS) thereof. FIG. 10 shows an enlarged perspective view of suction side of forwardmost tip rail 260F including SS bevel surface 276, and FIG. 11 shows an enlarged perspective view of pressure side of forwardmost tip rail 260F including PS bevel surface 278.

Forwardmost tip rail 260F also includes two reference points used as "origins" for defining a shape of surfaces having a nominal profile substantially in accordance with Cartesian coordinate values of X, Y and Z set forth in a respective table herein. As shown in FIGS. 6 and 7, forwardmost tip rail 260F includes a forward edge 290 extending generally circumferentially, but perhaps having a mild curvature, along with the tip rail. Forward edge 290 is defined between a radially facing outer surface 292 of forwardmost tip rail 260F and a generally radially extending and forward-facing surface 294 of forwardmost tip rail 260F. A suction side origin 300 (FIG. 6) is defined as the terminal point at a suction side end of forward edge 290, and a pressure side origin 302 (FIG. 7) is defined as the terminal point at a pressure side end of forward edge 290. Origins 300, 302 are also shown together in FIGS. 3-5.

As shown in FIGS. 3-5, a "tip rail length" (TRL) as used herein is defined as a straight-line distance (i.e., ignoring any curvature in forwardmost tip rail 260F) between suction side origin 300 and pressure side origin 302. Legends for X, Y, Z directions at each origin 300, 302 are set in the drawings and Tables such that: the X direction extends axially and is positive in a forward direction from origins 300, 302 of forwardmost tip rail 260F, the Y direction extends circumferentially (generally along tip rail 260F) and is positive in a direction from origins 300, 302 towards the suction side of forwardmost tip rail 260F, and the Z direction extends radially from origins 300, 302 and is positive in a radially outward direction from forwardmost tip rail 260F.

Scallop surfaces 264, 266 and bevel surfaces 276, 278 have surface profiles, as defined herein, configured to remove mass compared to other tip shrouds to reduce creep from stress and to lengthen the life cycle of tip shroud 250 and blade 200. Each scallop and bevel surface 264, 266, 276, 278 of forwardmost tip rail 260F has a shape having a nominal profile substantially in accordance with Cartesian coordinate values of X, Y and Z set forth in a respective table herein and originating at one of suction side origin 300 and pressure side origin 302. The Cartesian coordinate values are non-dimensional values of from 0% to 100% convertible to distances by multiplying the values by the desired tip rail length TRL expressed in units of distance. That is, the X, Y, and Z coordinate values in the Tables have been expressed in normalized or non-dimensionalized form in values of from 0 to 1 (percentages). However, it should be apparent that any or all of the coordinate values could instead be expressed in distance units so long as the percentages and proportions are maintained.

To convert an X, Y or Z value of the Tables to a respective X, Y or Z coordinate value in units of distance, such as inches or meters, the non-dimensional X, Y or Z value given in the Tables can be multiplied by a desired or predetermined tip rail length (TRL) for a forwardmost tip rail 260F in such units of distance. By connecting the X, Y, and Z values with smooth continuing arcs, each coordinate can be identified and fixed, and the surface profiles of the various surfaces between the coordinates can be determined by smoothly connecting adjacent coordinates to one another and defining a surface therebetween, thus forming the nominal surface profile. The surfaces can be planar or may include some curvature so long as the X, Y, Z coordinates are present.

The values in the Tables are non-dimensionalized values generated and shown to three decimal places for determining the nominal profile of the various surfaces at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in the Tables. For example, in one embodiment, a tolerance of 15 percent of a thickness of direction normal to any surface can define a profile envelope for a tip rail or tip shroud design at cold or room temperature. In other words, a distance of 15 percent of a thickness in a direction normal to any surface along the surface profile can define a range of variation between measured points on an actual surface and ideal positions of those points, particularly at a cold or room temperature, as embodied by the disclosure. In another embodiment, a tolerance of 20 percent of a thickness of direction normal to any surface can define a profile envelope for a tip rail or tip shroud design at cold or room temperature. The surface profiles, as embodied herein, are robust to these ranges of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized values by a common scaling factor, which may be a larger or smaller number of distance units than might have originally been used for a forwardmost tip rail 260F of a given length (TRL). For example, the non-dimensionalized values in a table could be multiplied uniformly by a scaling factor of 2, 0.5, or any other desired scaling factor instead of or in addition to multiplying the TRL. In various embodiments, the X, Y, and Z distances are scalable as a function of the same constant or number to provide a scaled up or scaled down tip shroud.

Note that the data points shown in the drawings are merely representative and do not necessarily match the X, Y, Z coordinate data points in the Tables.

As shown in FIGS. 6 and 8, forwardmost tip rail 260F has suction side scallop surface 264 having a shape having a nominal profile substantially in accordance with Cartesian coordinate values of X, Y and Z set forth in TABLE I and originating at suction side origin 300. The Cartesian coordinate values are non-dimensional values of from 0% to 100% convertible to distances by multiplying the values by the tip rail length TRL expressed in units of distance. The X, Y and Z values are connected by smooth continuing arcs that are joined smoothly with one another to form the nominal profile that defines SS scallop surface 264.

TABLE I

[non-dimensionalized values]

|   | X | Y | Z |
|---|---|---|---|
| 1 | −0.02 | −0.02 | 0.00 |
| 2 | −0.13 | −0.09 | −0.10 |
| 3 | −0.14 | −0.10 | −0.10 |

TABLE I-continued

[non-dimensionalized values]

| | X | Y | Z |
|---|---|---|---|
| 4 | −0.14 | −0.10 | −0.10 |
| 5 | −0.15 | −0.10 | −0.10 |
| 6 | −0.15 | −0.11 | −0.10 |
| 7 | −0.16 | −0.11 | −0.10 |
| 8 | −0.16 | −0.11 | −0.10 |
| 9 | −0.21 | −0.15 | −0.08 |
| 10 | −0.23 | −0.16 | −0.07 |
| 11 | −0.24 | −0.17 | −0.07 |
| 12 | −0.25 | −0.18 | −0.06 |
| 13 | −0.27 | −0.19 | −0.05 |
| 14 | −0.28 | −0.20 | −0.04 |
| 15 | −0.29 | −0.21 | −0.03 |
| 16 | −0.30 | −0.21 | −0.02 |
| 17 | −0.31 | −0.22 | −0.01 |
| 18 | −0.31 | −0.22 | 0.00 |

As shown in FIGS. 7 and 9, forwardmost tip rail 260F has pressure side scallop surface 266 having a shape having a nominal profile substantially in accordance with Cartesian coordinate values of X, Y and Z set forth in TABLE II and originating at pressure side origin 302. The Cartesian coordinate values are non-dimensional values of from 0% to 100% convertible to distances by multiplying the values by the tip rail length TRL expressed in units of distance. The X, Y and Z values are connected by smooth continuing arcs that are joined smoothly with one another to form the nominal profile that defines PS scallop surface 266.

TABLE II

[non-dimenionalized values]

| | X | Y | Z |
|---|---|---|---|
| 1 | −0.029 | −0.021 | 0.000 |
| 2 | −0.099 | −0.067 | −0.071 |
| 3 | −0.107 | −0.072 | −0.077 |
| 4 | −0.118 | −0.079 | −0.085 |
| 5 | −0.128 | −0.087 | −0.090 |
| 6 | −0.140 | −0.094 | −0.095 |
| 7 | −0.151 | −0.102 | −0.098 |
| 8 | −0.163 | −0.111 | −0.100 |
| 9 | −0.175 | −0.119 | −0.100 |
| 10 | −0.186 | −0.127 | −0.099 |
| 11 | −0.198 | −0.136 | −0.096 |
| 12 | −0.256 | −0.178 | −0.078 |
| 13 | −0.265 | −0.185 | −0.075 |
| 14 | −0.274 | −0.191 | −0.070 |
| 15 | −0.282 | −0.198 | −0.063 |
| 16 | −0.289 | −0.204 | −0.056 |
| 17 | −0.296 | −0.209 | −0.047 |
| 18 | −0.302 | −0.214 | −0.038 |
| 19 | −0.305 | −0.216 | −0.030 |
| 20 | −0.305 | −0.217 | −0.022 |

As shown in FIGS. 6 and 10, forwardmost tip rail 260F has suction side bevel surface 276 with a shape having a nominal profile substantially in accordance with Cartesian coordinate values of X, Y and Z set forth in TABLE III and originating at suction side origin 300. The Cartesian coordinate values are non-dimensional values of from 0% to 100% convertible to distances by multiplying the values by the tip rail length TRL expressed in units of distance. The X, Y and Z values are connected by smooth continuing arcs that are joined smoothly with one another to form the nominal profile that defines SS bevel surface 276.

TABLE III

[non-dimensionalized values]

| | X | Y | Z |
|---|---|---|---|
| 1 | −0.182 | −0.130 | −0.122 |
| 2 | −0.059 | −0.042 | −0.121 |
| 3 | −0.064 | −0.087 | −0.125 |
| 4 | −0.104 | −0.335 | −0.148 |

As shown in FIGS. 7 and 11, forwardmost tip rail 260F has pressure side bevel surface 278 having a shape having a nominal profile substantially in accordance with Cartesian coordinate values of X, Y and Z set forth in TABLE IV and originating at pressure side origin 302. The Cartesian coordinate values are non-dimensional values of from 0% to 100% convertible to distances by multiplying the values by the tip rail length expressed in units of distance. The X, Y and Z values are connected by smooth continuing arcs that are joined smoothly with one another to form the nominal profile that defines PS bevel surface 278.

TABLE IV

[non-dimensionalized values]

| | X | Y | Z |
|---|---|---|---|
| 1 | −0.268 | −0.186 | −0.103 |
| 2 | −0.069 | −0.108 | −0.149 |
| 3 | −0.051 | −0.238 | −0.167 |
| 4 | −0.016 | −0.055 | −0.136 |
| 5 | −0.059 | −0.035 | −0.122 |

The disclosed surface profiles provide lower mass to tip shroud 250, reducing creep due to stress and lengthening a life of tip shroud 250 and blade 200. The surface profiles, however, do not change interaction between adjacent tip shrouds 250 within a stage in turbine 108 (FIG. 1), nor do they change aerodynamic efficiency.

The X, Y, Z data points in each of TABLES I through IV herein may be joined smoothly with one another (with lines and/or arcs) to form the respective surface profiles using any now known or later developed curve fitting technique generating a curved surface appropriate for the respective surface profile, e.g., bevel and/or scallop surfaces. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The teachings of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine blade comprising:
   an airfoil having: a suction side, a pressure side opposing the suction side, a leading edge spanning between the pressure side and the suction side, and a trailing edge opposing the leading edge and spanning between the pressure side and the suction side; and
   a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin,
   wherein the forwardmost tip rail has a suction side scallop surface having a shape having a nominal profile substantially in accordance with Cartesian coordinate values of X, Y and Z set forth in TABLE I and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side scallop surface.

2. The turbine blade of claim 1, wherein the turbine blade includes a third stage blade.

3. The turbine blade of claim 1, wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

4. The turbine blade of claim 1, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

5. The turbine blade of claim 1, wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

6. The turbine blade of claim 1, wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface; and
   wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

7. The turbine blade of claim 1, wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface; and
   wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

8. The turbine blade of claim 1, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface; and wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

9. The turbine blade of claim 8, wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

10. A turbine blade comprising:
an airfoil having: a suction side, a pressure side opposing the suction side, a leading edge spanning between the pressure side and the suction side, and a trailing edge opposing the leading edge and spanning between the pressure side and the suction side; and
a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin,
wherein the forwardmost tip rail has a pressure side scallop surface having a shape having a nominal profile substantially in accordance with Cartesian coordinate values of X, Y and Z set forth in TABLE II and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side scallop surface.

11. The turbine blade of claim 10, wherein the turbine blade includes a third stage blade.

12. The turbine blade of claim 10, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs joined that are smoothly with one another to form the nominal profile that defines the suction side bevel surface.

13. The turbine blade of claim 10, wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

14. The turbine blade of claim 10, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface; and wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

15. A turbine blade comprising:
an airfoil having: a suction side, a pressure side opposing the suction side, a leading edge spanning between the pressure side and the suction side, and a trailing edge opposing the leading edge and spanning between the pressure side and the suction side; and
a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a suction side bevel surface having a shape having a nominal profile substantially in accordance with Cartesian coordinate values of X, Y and Z set forth in TABLE III and originating at the suction side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the suction side bevel surface.

16. The turbine blade of claim 15, wherein the turbine blade includes a third stage blade.

17. The turbine blade of claim 15, wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

18. A turbine blade comprising:

an airfoil having: a suction side, a pressure side opposing the suction side, a leading edge spanning between the pressure side and the suction side, and a trailing edge opposing the leading edge and spanning between the pressure side and the suction side; and a tip shroud connected with the airfoil along the suction side, the pressure side, the trailing edge and the leading edge, the tip shroud including a forwardmost tip rail extending radially therefrom, the forwardmost tip rail having a forward edge including a suction side origin closest to the suction side of the airfoil and a pressure side origin closest to the pressure side of the airfoil, and a tip rail length defined by a straight line between the pressure side origin and the suction side origin, wherein the forwardmost tip rail has a pressure side bevel surface having a shape having a nominal profile substantially in accordance with Cartesian coordinate values of X, Y and Z set forth in TABLE IV and originating at the pressure side origin, wherein the Cartesian coordinate values are non-dimensional values of from 0% to 100% convertible to distances by multiplying the values by the tip rail length expressed in units of distance, and wherein X, Y and Z values are connected by smooth continuing arcs that are joined smoothly with one another to form the nominal profile that defines the pressure side bevel surface.

19. The turbine blade of claim 18, wherein the turbine blade includes a third stage blade.

* * * * *